Patented Apr. 29, 1941

2,240,073

UNITED STATES PATENT OFFICE 2,240,073

SUBSTITUTED PHENOLS

Russell L. Jenkins, Webster Groves, Mo., assignor to Monsanto Chemical Company, St. Louis, Mo., a corporation of Delaware No Drawing. Application November 18, 1936, Serial No. 111,350

12 Claims. (Cl. 260—620)

The present invention relates to hydroxy diphenylbenzenes, specifically to a mixture of phenols derived from the diphenylbenzenes which result from the pyrolysis of benzene in the production of diphenyl, and furthermore, to a new phenol of this series, specifically, 2,4-diphenylphenol.

The object of the invention is to provide a new phenolic product of high boiling point and having an unusual number of desirable properties. When benzene is subjected to pyrolysis a crystalline material is obtained, having a boiling range at atmospheric pressure between 320° and 380° C., the major portion (about 60% of the total) having a boiling range of 360° to 380° C., but smaller proportions have boiling points beyond 380° C. and as high as 464° C. For the most part, these higher boiling products consist of diphenylbenzene isomers, principally the 1,4-diphenylbenzene and the 1,3-diphenylbenzene, together with smaller proportions of 1,2-diphenylbenzene and compounds of greater complexity, that is, compounds having a greater number of benzene residues in the molecule and compounds having more completely condensed ring systems. For convenience, these higher boiling products will be referred to hereinafter as mixed diphenylbenzenes.

The invention also contemplates a new pure phenol of this series, 2,4-diphenylphenol, which can also be designated as 1,3-diphenyl-4-hydroxybenzene, whose preparation is described hereinafter.

The invention is based on the discovery that 2,4-diphenylphenol and phenols derived from the mixed diphenylbenzenes are effective germicides, especially in the form of their chlorinated derivatives and their alkali metal salts. These free phenols exhibit antioxidant properties on materials such as gasoline, lubricating oils, vegetable oils and rubber. With formaldehyde they condense in the presence of acid and alkaline catalysts to yield oil-soluble resinous materials which are especially useful for the preparation of rapid-drying oil varnishes. These phenols are intermediates for the production of hydroxy carboxylic acids which correspond to substituted salicylic acids, by the method of the Kolbe synthesis, that is, by treatment of their alkali metal salts with carbon dioxide under pressure.

The description which follows comprises preferred methods for the production of these phenols by hydroxylation of the hydrocarbons.

The conversion of the mixed diphenylbenzenes to phenols can be accomplished by two general methods, similar to the methods for the production of phenol from benzene:

1. Sulfonation of the mixed diphenylbenzenes followed by treatment of the sodium salts of the resulting sulfonic acids with sodium hydroxide; and, 2. By chlorination of the mixed diphenylbenzenes and subsequent catalytic hydrolysis of the resulting compounds.

When the conversion of the mixed diphenylbenzenes is conducted to monohydric phenolic compounds by the sulfonation method, the resulting phenols are solids of relatively high melting point. The monohydric phenols obtained by the chlorination method are viscous liquids at room temperature. The products obtained by these two methods are of substantially the same composition, that is, they are predominantly hydroxy-diphenylbenzenes, but differ somewhat in physical characteristics because of the different proportions of their various isomeric constituents.

To prepare the monosulfonic acids of the mixed diphenylbenzenes, the procedure is similar to that described in Patent No. 1,865,776 granted to C. R. McCullough. The mixed diphenylbenzenes are heated in a sulfonation kettle to a temperature of about 85° C. An equal part by weight of 66° Bé. sulfuric acid is added slowly with vigorous agitation. The temperature will rise as a result of the heat of reaction. During the additions of sulfuric acid the temperature may be permitted to rise to about 110°–115° C. but should not be allowed to rise substantially beyond this temperature. The sulfonation mixture is maintained at this temperature for an additional hour while the mass is stirred. At the end of this time the reaction is tested for completeness by adding a sample of the mixture to about 50 volumes of boiling water. A clear solution indicates absence of unreacted hydrocarbons, whereas a cloudy solution indicates their presence. Should test indicate that the reaction is still incomplete, the sulfonation is continued until a satisfactory test is obtained, making the conditions of sulfonation somewhat more drastic by raising the temperature up to as high as 150° C. or more if necessary. The above sulfonation conditions may be varied in known manner, by using more concentrated sulfuric acid and a lower temperature, or by using less concentrated acid and a higher temperature. The diphenylbenzenes need not be in a molten condition during the sulfonation, but should be kept well agitated throughout the heating.

From the sulfonation mixture the sulfonic acids are separated by dilution with water and crystallized from the diluted acid in the usual manner for recovering sulfonic acids. The crystals obtained are washed with cold water to remove adherent excess acid. Alternatively, the sulfonic acids may be recovered as their sodium salts.

The resulting sulfonic acids are then converted to their sodium salts and a concentrated solution thereof prepared, or, if they were already recovered in the preceding step as the sodium salts, a concentrated solution thereof is prepared. This concentrated solution is fed into a fusion kettle containing molten sodium hydroxide to which has been added a small proportion of water and which is at a temperature of about 300° to 420° C. The exact temperature to use in the fusion is dependent to a large extent on the particular materials being treated. The description which follows is for a mixture that was easily converted to phenols, hence if a mixture more difficult to convert to phenols is being treated the temperature specified must be accordingly raised. The solution is pumped to the sodium hydroxide melt under the surface of the melt. Approximately three molecular equivalents of alkali are employed in the reaction, therefore the solution of the sodium sulfonates is added until the contents of the fusion kettle approximate these proportions. The contents of the kettle are then maintained at a temperature of about 305°–310° for about 6 hours and brought up to 330° C. for an hour before terminating the heating. The sodium sulfite formed in the reaction is substantially insoluble in a concentrated sodium hydroxide solution and separates out as the reaction mixture is then transferred to a vessel containing approximately an equal volume of water. The concentrated solution is separated from the sodium sulfite precipitate by filtration, suitably over a nickel gauze of fine mesh. From the concentrated solution containing the sodium salts of the phenols, together with some excess alkali, the phenols are separated by neutralizing the solution by carbon dioxide, sulfur dioxide, sulfonic acids consisting of the next batch to be treated or similar acidic substances.

The phenols separate out as a slurry over the residual aqueous solution, which slurry is decanted and filtered and subjected to further purification, in known manner, for example, by distillation in vacuo, or by reprecipitation from alkaline solution or by crystallization from benzene, petroleum solvents, or alcohol, in which solvents the phenols are soluble. Inasmuch as the phenols are soluble in alcohol but insoluble in water, precipitation from an alcoholic solution by water can be used as a method of purification.

The phenols obtained by the above procedure are white crystalline or resinous solids of variable melting point, their nature varying somewhat with the composition of the original hydrocarbon mixture from which they are derived. By distillation in vacuum various fractions can be separated.

The sulfonation can be carried to beyond the monosulfonic acid stage by known methods, in which event the further treatment by alkali fusion yields polyhydric phenols as products. A typical procedure for the preparation of the phenols of mixed diphenylbenzenes by the method of chlorination and subsequent hydrolysis of the chlorinated hydrocarbons follows:

The mixed diphenylbenzenes are chlorinated by passing chlorine thereinto in the presence of iron while the reaction mass is at a temperature of 150° to 180° C., in the manner described in my patent, No. 1,892,398, dated December 27, 1932. The amount of chlorine combined is determined as chlorination progresses by noting the increase in weight of the reaction mixture. After the desired amount of chlorine has combined, the chlorination is stopped. The chlorination is carried to the point corresponding to a monochlorinated diphenylbenzene when a monohydric phenolic end-product is desired, but is carried to the dichlorinated stage or a higher stage if dihydric or polyhydric phenolic derivatives are to be the end-products.

The chlorinated hydrocarbon is then hydrolyzed by a treatment with aqueous alkali under pressure. When treating a monochloro diphenylbenzene the proportions to use are approximately 300 grams of the chlorinated compound to 2000 grams of a 10 percent solution of sodium hydroxide and these proportions are charged into an autoclave which can be rocked to keep the mixture agitated. The autoclave is heated until the temperature reaches 360° C., it being rocked during the entire heating, and is maintained at this temperature for about forty minutes. The autoclave is allowed to cool thereafter and the product is removed therefrom.

The product as removed from the autoclave is heated to boiling and filtered. The insoluble residue is heated with 1000 cc. of 10 percent sodium hydroxide solution (for 300 grams of original chlorinated hydrocarbon) until the mixture boils and is again filtered. The filtrates which are now alkaline are acidified with hydrochloric acid and the hydroxy compounds separate as a viscous resinous solid which is separated by filtration and washed several times with boiling water and dried by heating to about 200° C. The product is further purified by distillation in vacuum.

To treat higher chlorinated diphenylbenzenes to produce polyhydric phenols, greater proportions of alkali are required as is known in the art.

The monohydric phenolic derivatives of mixed diphenylbenzenes made by the described chlorination procedure is a liquid viscous oil which, when purified, is of light straw color.

The alkali metal salts of the mixed diphenylphenols can be prepared by the procedure which follows hereinafter. Still another alternative method for the production of phenols of the mixed diphenylbenzenes follows in the method used for the production of 2,4-diphenylphenol:

2,4-diphenylaniline can be obtained by the procedure described by Wardner and Lowy (J. Amer. Chem. Soc., 1932, vol. 54, p. 2514), by nitration of diphenylbenzene and subsequent reduction of the resulting nitro compounds.

Fifty grams of 2,4-diphenylaniline is heated in a beaker with 270.5 cc. of concentrated hydrochloric acid until a fine precipitate of the hydrochloride forms. The mixture is then cooled to 5°–10° C.

A solution of 14.3 grams of sodium nitrite in 150 cc. of water, cooled to about 10° C., is then slowly added with stirring to the cooled mixture or slurry containing the hydrochloride crystals. The temperature of the reaction mixture is maintained below 10° C. Stirring is maintained for about 20 minutes after completion of the additions of sodium nitrite solution, after which the small quantity of insoluble matter is removed by filtration.

The filtered diazonium salt solution at a temperature of about 15° C. is then added slowly with stirring to about 1 liter of boiling water. This addition should be made at such a rate that about 1 hour is required and the diazotized solution should be maintained at about 10° C. The hydroxy compound separates from the boiling water as a molten mass. The water containing the hydroxy compound is allowed to cool, whereupon the phenol becomes a little harder but still retains a non-crystalline appearance. The water is drained off and the phenol is washed several times with water.

The crude phenol is purified by distillation in vacuum. Its boiling point is about 208°–221° C. at a pressure of 4 mm. of mercury. The fraction boiling at this temperature can be further purified by dissolving it in caustic soda solution and reprecipitating with hydrochloric acid. In this purification the phenol precipitates as an oil and crystallizes when cooled with ice. The crystals can be separated by filtration and when again distilled boil at a temperature of approximately 210°–215° C. at a pressure of 4 mm. The melting point of the pure phenol is 90.0–90.2° C.

The hydroxy compound is also conveniently crystallized from coal-tar solvent naphtha.

The sodium salt is very soluble in water. It is conveniently prepare by neutralizing the pure phenol with stoichiometrical proportions of sodium hydroxide solution and recovering the salt by evaporation of the solution. Alternatively, the neutralized solution can be evaporated to a small volume and the solution can be allowed to crystallize slowly. The sodium salt is a white solid which crystallizes in the form of rectangular plates.

In an analogous manner the potassium and similar salts can be prepared. The recovery of salts which are insoluble in water can be made without recourse to evaporation, that is, they can be removed by filtration from the residual liquid.

The preferred methods of practicing the invention have been recited but it is to be understood that the invention is not limited to any particular method of preparing the compounds specified, except insofar as such limitations are imposed by the appended claims.

Reference is made to my copending application, Serial No. 360,902, filed October 12, 1940, in which is claimed subject matter disclosed but not claimed herein.

I claim:

1. A mixture of essentially monohydric phenols obtained by the hydroxylation of polyphenyl hydrocarbons having boiling points in excess of the boiling point of diphenyl, said hydrocarbons being produced by the pyrolysis of benzene.

2. A mixture of essentially monohydroxy-diphenylbenzenes obtained by the hydroxylation of the diphenylbenzenes resulting from the pyrolysis of benzene.

3. A mixture as defined in claim 1, in which the hydroxylation has been effected by sulfonation of said hydrocarbons and subsequent treatment with alkali of the resulting sulfonic acids.

4. A mixture as defined in claim 2, in which the hydroxylation has been effected by sulfonation of said diphenylbenzenes and subsequent treatment with alkali of the resulting sulfonic acids.

5. A mixture as defined in claim 1, in which the hydroxylation has been effected by chlorination of said hydrocarbons and subsequent hydrolysis of the resulting chlorinated hydrocarbons.

6. A mixture as defined in claim 2, in which the hydroxylation has been effected by chlorination of said diphenylbenzenes and subsequent hydrolysis of the resulting chlorinated diphenylbenzenes.

7. A mixture as defined in claim 1 and further characterized in that the hydroxylation has been effected by nitration of said hydrocarbons, reduction of the resulting nitro-compounds, diazotization of the resulting amino-compounds, and hydrolysis of the resulting diazo-compounds.

8. A mixture of hydroxylated aromatic compounds obtained by the hydroxylation of polyphenyl hydrocarbons having boiling points in excess of the boiling point of diphenyl, said hydrocarbons being produced by the pyrolysis of benzene.

9. A mixture as defined in claim 8, in which the hydroxylation has been effected by sulfonation of said hydrocarbons and subsequent treatment with alkali of the resulting sulfonic acids.

10. A mixture as defined in claim 8, in which the hydroxylation has been effected by chlorination of said hydrocarbons and subsequent hydrolysis of the resulting chlorinated hydrocarbons.

11. A mixture as defined in claim 8, in which the hydroxylation has been effected by nitration of said hydrocarbons, reduction of the resulting nitro-compounds, diazotization of the resulting amino-compounds, and hydrolysis of the resulting diazo-compounds.

12. A composition of matter consisting of a mixture of phenolic compounds selected from the group consisting of (1) mixtures of essentially monohydroxy diphenylbenzenes obtained by the hydroxylation of the diphenylbenzenes resulting from the pyrolysis of benzene and (2) alkali-metal salts of said mixtures of essentially monohydroxy diphenylbenzenes.

RUSSELL L. JENKINS.